Oct. 23, 1956 A. T. TYREE 2,767,669
TUBULAR SUPPORT FOR AWNING ROOFS
Filed March 17, 1952 2 Sheets-Sheet 1
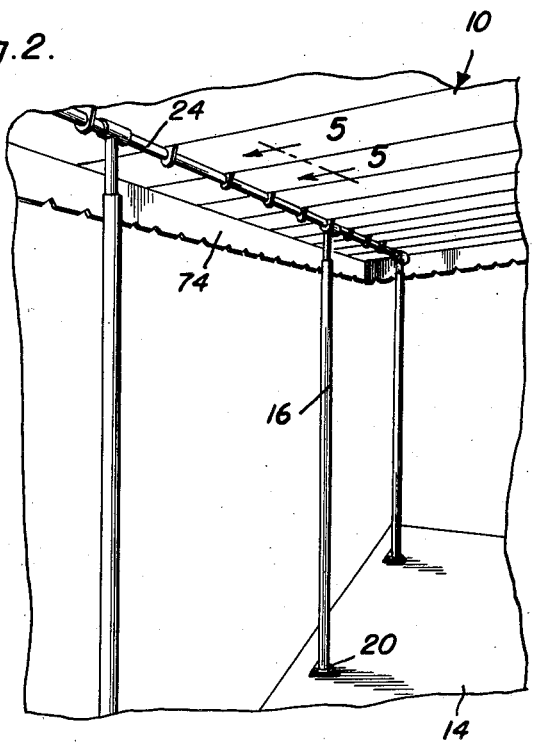
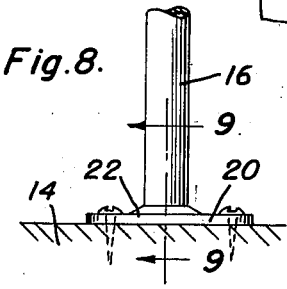
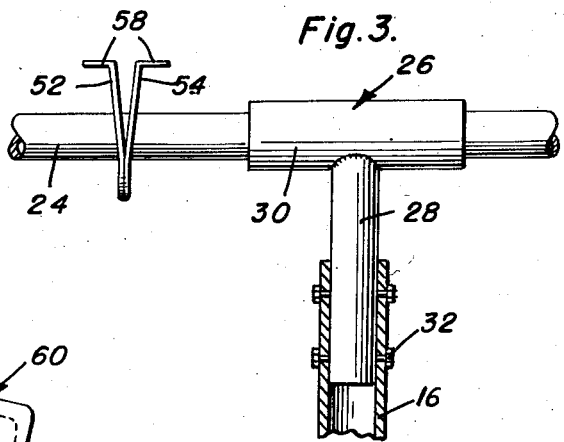
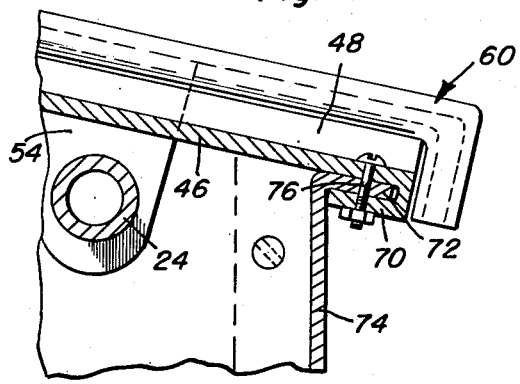
Andrew T. Tyree
INVENTOR.

Oct. 23, 1956
A. T. TYREE
2,767,669
TUBULAR SUPPORT FOR AWNING ROOFS
Filed March 17, 1952
2 Sheets-Sheet 2
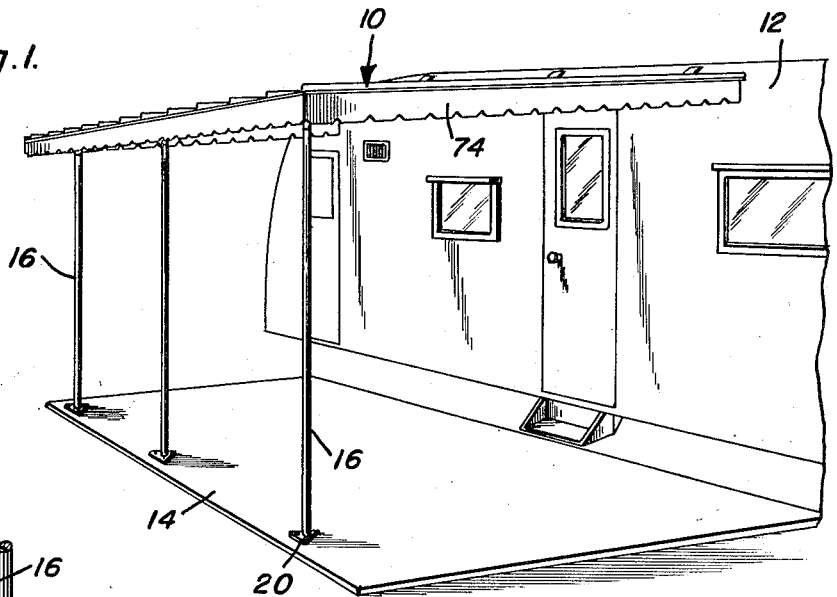
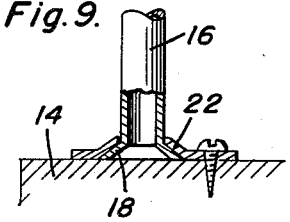
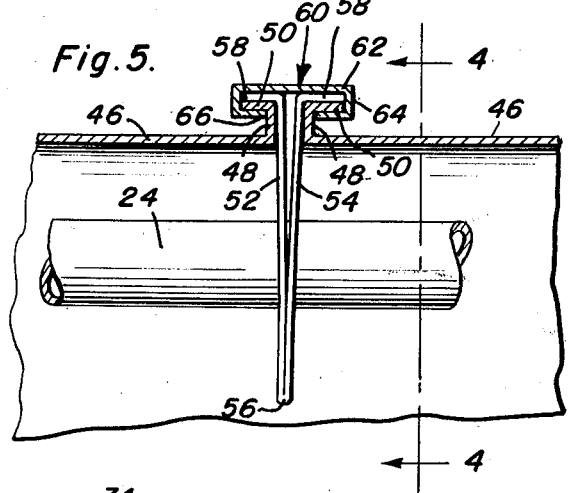
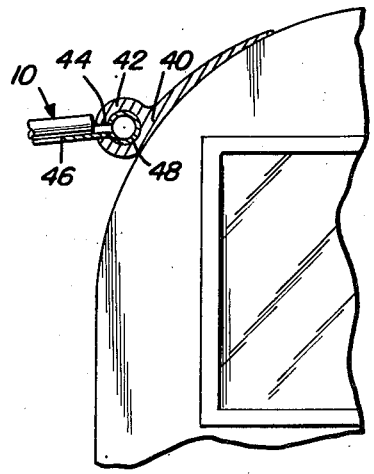
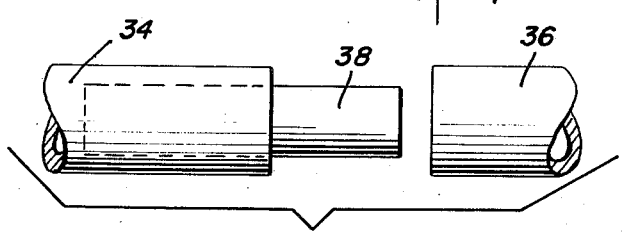
Andrew T. Tyree
INVENTOR.
BY
Attorneys United States Patent Office 2,767,669
Patented Oct. 23, 1956

2,767,669

TUBULAR SUPPORT FOR AWNING ROOFS

Andrew T. Tyree, Miami, Fla., assignor to Modern Metal Craftsmen, Inc., Miami, Fla., a corporation of Florida Application March 17, 1952, Serial No. 276,953

6 Claims. (Cl. 108—1)

This invention comprises novel and useful improvements in a tubular support for awning roofs and more specifically pertains to an awning roof and supporting structure therefor which will readily admit of easy assembling of the components of an awning roof in any desired dimensions and sizes, and in various pitches or slopes of the roof, and will detachably but securely fasten the roof components together and to the supporting structure.

The primary object of this invention is to provide an inexpensive, easily assembled awning roof structure consisting of a relatively small number of standardized elements and which may be easily erected in a minimum of time and by unskilled labor to provide an awning roof.

A further object of the invention is to provide an awning roof structure conformative with the foregoing object which shall be especially adapted for attachment to the side of an automobile trailer or the like.

A very important specific object of the invention resides in the provision of an awning roof construction in accordance with the foregoing objects in which the roof shall be secured to and supported by the support structure and in spaced relation thereto in an improved, easily assembled manner.

A still further important specific object of the invention is to provide an improved support bracket which shall assist in securing sheet metal panels of a roof together to form a complete roof and to attach these panels to a horizontal support rod in a more convenient manner.

Yet another important specific object of the invention is to provide a support bracket conformative with the above mentioned objects which may be economically manufactured from sheet metal, yet shall have sufficient rigidity to support the roof from a horizontal support rod; and which will enable any desired positioning or spacing of the supporting brackets upon the support rod, and will admit of forming the roof with any desired pitch.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view showing a suitable arrangement whereby an awning roof is secured to the side of an automobile trailer and to a supporting structure;

Figure 2 is a fragmentary perspective view showing a portion of the supporting structure and the underside of the awning roof carried thereby;

Figure 3 is a fragmentary elevational detail view showing in vertical section the upper part of a vertical support member, a horizontal support rod mounted thereon, together with one of the awning roof support brackets mounted upon the support rod;

Figure 4 is a vertical transverse sectional detail view taken substantially upon the plane indicated by the section line 4—4 of Figure 5 and showing the manner in which a valance element is secured to a roof panel and the latter in turn is secured to a horizontal support rod;

Figure 5 is a fragmentary vertical sectional detail view taken substantially upon the plane indicated by the section line 5—5 of Figure 2 and showing in particular the manner in which the support bracket is secured upon the horizontal support rod, is associated with a pair of adjacent awning roof panels, and these members are secured to each other by a fastening clip;

Figure 6 is a fragmentary detail view, partly in vertical section, indicating the manner in which the upper edge of the awning roof is detachably secured to an automobile trailer;

Figure 7 is a detail view in exploded perspective showing the manner in which the horizontal rod may be composed of a number of detachable, joined sections to form a support rod of any desired length;

Figure 8 is a fragmentary elevational view showing the manner in which a vertical support post may be anchored to a foundation; and Figure 9 is a vertical sectional detail view taken substantially upon the plane indicated by the section line 9—9 of Figure 8.

In the accompanying drawings, there is illustrated, in order to set forth the principles of construction and operation of this invention, an awning roof specifically adapted for use with an automobile trailer, in a manner to that set forth in my prior co-pending application Serial No. 123,917, for Prefabricated Sheet Metal Housing, filed October 27, 1949. It will be appreciated that the features of construction by which the sections making up the roof are secured to each other and to the supporting structure, and which form the subject matter of the present application and are claimed herein, are not limited in their utility to the particular use illustrated in the drawings.

Reference is now made more specifically to the accompanying drawings, wherein like numerals designate similar parts throughout the various views, the awning roof indicated generally by the numeral 10 being illustrated as detachably secured to an automobile trailer 12 or any other suitable supporting surface, by a detachable connection, the other end of the roof being supported by and secured to a novel supporting structure.

As shown in Figures 1, 2, 8 and 9, there is provided a suitable base or foundation 14 of any desired character, upon which are mounted vertical support posts 16 preferably of tubular construction and of standard commercial elements.

The lower ends of the support posts 16 are preferably outwardly flared to provide conical terminals 18 which directly rest upon the foundation 14, anchoring plates 20 which may be triangular or of any other suitable shape being provided with apertured upwardly flaring conical projections 22 which slidably embrace the posts 16 and overlie the terminal portions 18 thereof to thus clamp and hold these terminal portions upon the foundation 14.

At their upper ends, the vertical support posts 16 are provided with laterally enlarged portions which are transversely bored to slidably receive a transversely or horizontally extending tubular support rod 24. Although in some instances the laterally enlarged upper end of the vertical support post 16 may be integral therewith, and may be formed as by flattening or enlarging the end of the post, it is also possible to provide separate terminal members for this purpose. Thus, as shown in Figure 3, a T-shaped terminal member indicated generally by the numeral 26 may be provided for each post, the same including a vertical tubular stem 28 together with a horizontal tubular cross-piece 30. The stem is received within the upper end of the tubular post 18, and is fixedly secured or attached thereto as by fastening bolts 32 or the like. The horizontal support rod 24 is slidably received in the cross-piece 30 and thus supported thereby.

The horizontal support rod 24 may be a single member extending the entire length of the awning roof, or alternatively may be constructed of two or more tubular sections removably secured to each other. Referring to Figure 7 it will be seen that this arrangement may consist of a pair of tubular sections 34 and 36, of the same external diameter, and adapted to be disposed in endwise abutting engagement. A cylindrical connecting member 38, which may be tubular or solid if desired, is driven into the end of one of the members, such as the member 34, and thereafter is permanently secured therein, while the extending end of this member 38 is slidably and removably received in the open end of the other section 36.

Various expedients may be utilized to insure the relatively permanent securing of the member 38 in one of the sections 34, and its frictional, sliding but removable engagement in the other section 36. In one convenient way, these elements may be of aluminum construction, and the member 38 may be forcibly driven into the member 34. The extending end of the member 38 may be of a slightly less diameter than the bore of the section 36, or may be turned down to make a slightly looser fit therein. It is a physical characteristic of aluminum in this use, that when once driven into the member 34, the parts will be substantially permanently united, while the relatively looser fit in the member 36 constitutes a detachable connection.

In either event, the rod 24, whether of one-piece construction or of sectional construction, functions as a single member, supported in the terminal members 26 a substantially horizontal position upon the vertical support post 18 and below the awning roof 10.

Any convenient manner is provided for securing the upper end of the awning roof to the trailer 12 or other supporting surface. The means illustrated in Figure 6 forms no part of the present invention, but has been set forth in detail in my above identified co-pending application. Briefly, the same includes a supporting bracket 40 secured to the trailer roof, and having a cylindrical portion 42 with a horizontally extending bore therethrough. A longitudinal slot 44 is provided in the cylindrical portion 42 and the upper end of the roof panels 46 extends through this longitudinal slot and is slidable longitudinally of the same, being provided with a cylindrical bead 48 which is seated in the bore of the member 42.

Reference is now made more specifically to Figure 5 wherein it will be seen that the awning roof 10 includes two or more elongated sheet metal panels 46, which have their adjacent side edges provided with perpendicular flanges 48 which are parallel to each other and which at their upper ends have laterally extending flanges 50 which overlie and extend back over the panels 46. One or more roof supporting brackets are provided, one such bracket being positioned between each pair of adjacent panels 46 upon each support rod 24. The support brackets are preferably of sheet metal, the same including a pair of co-extensive side portions 52 and 54 which are integrally connected to each other by a medial fold 56 of the material of the bracket. The two side portions are apertured to be slidably received upon the support rod 24 whereby the brackets are retained upon the rod, and may be readily adjusted longitudinally thereof in order to be properly positioned for coaction with the roof panels.

When disposed upon the support rod 24, the bracket portions 52 and 54 extend upwardly therefrom and between the adjacent parallel flanges 48 of a pair of awning panels. With the awning panels positioned at the desired pitch, the upper ends of the portions are bent horizontally across the edge of the lateral flanges 50 to overlie and rest upon the top surface of the same. Alternatively, the brackets may be of pre-formed construction, and already bent to provide horizontal flanges 58 of the desired size and at the desired angle. In either event, the adjacent surfaces of the lateral flanges 50 and of the horizontal flanges 58 are disposed in side-by-side engagement as shown in Figure 5, and the slidable elongated fastening clip indicated generally by the numeral 60 is applied to hold the parts in engagement. The fastening clip has a flat upper member 62 with longitudinal side edges being downturned to provide marginal flanges 64 which embrace the opposite side edges of the lateral flanges 50, and which are then provided with inturned flanges 66 parallel to the portions 62. The inturned flanges 66 underlie and embrace the lateral flanges 52 thus securing the horizontal flanges 58 in close contact with the lateral flanges 50 to thus rigidly unite the support bracket and the awning panels to the support rod.

In some instances it may be preferred to form the bracket with the side portions 52 and 54 inherently resiliently biased outwardly from each other, toward the position indicated in Figure 3, to thus supply a tensioning effect to the roof panels to insure a tight engagement of the same together, and avoid loosening or rattling of the joints.

As shown in Figure 4, a sheet metal valance may be secured to the awning roof. For this purpose, the lower or outer edges of the roof panels are provided with inturned underlying flanges 70, which receive the upper outturned flanges 72 of the valance panel 74, these parts being detachably secured together as by fastening bolts or the like 76.

From the foregoing, it will be apparent that the brackets provide a convenient means of assembling awning roof panels of various dimensions to each other and to the support rod 22 in a fixed but spaced relation. Further, as set forth hereinbefore, the brackets are adaptable to secure roofs of different pitches or slopes, thus facilitating the building or tailoring of an awning roof to fit the preferences and needs of the individual.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. An awning roof construction comprising vertical supports, a horizontal rod carried by said vertical supports, a plurality of roof fastening brackets each slidably mounted upon said rod for movement longitudinally thereof, a roof, means securing said brackets to said roof for attaching the latter to said rod, said roof including a pair of panels having adjacent edges extending transversely of said rod, one of said brackets extending between and overlying adjacent edges of both of said panels, said securing means engaging said bracket and both of said panels, said bracket comprising a metallic sheet having a medial fold with a pair of co-extensive portions in side-by-side relation, the portions adjacent the fold being apertured for sliding engagement upon the rod and at their ends remote from the folds being engaged with said panels.

2. An awning roof construction comprising vertical supports, a horizontal rod carried by said vertical supports, a plurality of roof fastening brackets each slidably mounted upon said rod for movement longitudinally thereof, a roof, means securing said brackets to said roof for attaching the latter to said rod, said roof including a pair of panels having adjacent edges extending transversely of said rod, one of said brackets extending between and overlying adjacent edges of both of said panels, said securing means engaging said bracket and both of said panels, said bracket comprising a metallic sheet having a medial fold with a pair of co-extensive portions in side-by-side relation, the portions adjacent the fold being apertured for sliding engagement upon the rod and at their ends remote from the folds being engaged with said panels, the adjacent parts of said panels having parallel flanges terminating in lateral flanges, said portions engaging said parallel flanges and overlying said lateral flanges, said securing means comprising an elongated clip slidably engaging and embracing said portions and said lateral flanges.

3. An awning roof construction including a horizontal rod of circular cross-section, a plurality of roof fastening brackets each slidably mounted upon said rod for movement longitudinally thereof, each bracket being of one piece construction and having an aperture for slidably receiving said rod, a roof, said brackets having bendable portions extending generally longitudinally of the rod and engageable with the roof for attaching the latter to the rod, each bracket comprising a flat strip of bendable material having a midportion folded upon itself to provide two thicknesses of material in side-by-side relation, said aperture extending through the two thicknesses of material of said midportion, the ends of the material constituting said bendable portions.

4. An awning roof construction including a horizontal rod of circular cross-section, a plurality of roof fastening brackets each slidably mounted upon said rod for movement longitudinally thereof, each bracket being of one piece construction and having an aperture for slidably receiving said rod, a roof, said brackets having bendable portions extending generally longitudinally of the rod and engageable with the roof for attaching the latter to the rod, each bracket comprising a flat strip of bendable material having a midportion folded upon itself to provide two thicknesses of material in side-by-side relation, said aperture extending through the two thicknesses of material of said midportion, the ends of the material constituting said bendable portions, the midportion being of resilient material whereby the two thicknesses of material will be resiliently biased outwardly of each other to thereby cause a resilient frictional engagement with said rod.

5. A fastening bracket for a sheet metal awning roof comprising a thin flat relatively narrow strip of sheet metal medially folded to provide a pair of legs extending from the folded portion in side-by-side relation, said legs having outwardly divergent portions adjacent the medially folded portion, the divergent portions having registering apertures of greater cross-sectional area than that of a horizontal support rod for receiving the latter therethrough for supporting said bracket, said divergent portions having upwardly projecting flat extensions for reception thereof between and engaging adjacent edges of a pair of adjacent roof panels, the ends of said legs remote from the folded portion being of sufficient length to project from the support rod upwardly above the roof panels and being bendable for oppositely and outwardly disposed angular disposition for overlying adjacent roof panels and clamping the same to the support rod.

6. An awning roof construction comprising vertical supports, a horizontal rod carried by said vertical supports, a plurality of roof fastening brackets each slidably mounted upon said rod for movement longitudinally thereof, a roof, means securing said brackets to said roof for attaching the latter to said rod, said roof including a plurality of panels having adjacent edges extending transversely of said rod, one of said brackets extending between and overlying adjacent edges of a pair of adjacent panels, said securing means engaging said bracket and both of said adjacent panels, said bracket comprising a metallic sheet having a medial fold with a pair of coextensive portions in side by side relation, said bracket having a further portion adjacent the fold and which is apertured for sliding engagement upon the rod whereby to secure the bracket to the rod, said coextensive portions being engaged with said adjacent panels.

References Cited in the file of this patent

UNITED STATES PATENTS

| | | |
|---|---|---|
| 247,885 | Casley | Oct. 4, 1881 |
| 379,734 | Smith | Mar. 20, 1888 |
| 381,756 | Caldwell | Apr. 24, 1888 |
| 1,240,863 | Lyda | Sept. 25, 1917 |
| 1,733,007 | Dahl | Oct. 22, 1929 |
| 1,923,301 | Dunn | Aug. 22, 1933 |
| 2,306,537 | Hamm | Dec. 29, 1942 |
| 2,423,402 | Olson | July 1, 1947 |
| 2,508,757 | Gray | May 23, 1950 |
| 2,532,466 | Stemmons | Dec. 5, 1950 |
| 2,565,282 | Thompson | Aug. 21, 1951 |
| 2,573,060 | Rauglas | Oct. 30, 1951 |

FOREIGN PATENTS

| | | |
|---|---|---|
| 637,479 | Great Britain | May 17, 1950 |
| 648,527 | Great Britain | of 1951 |